(12) United States Patent
Lee et al.

(10) Patent No.: US 11,074,910 B2
(45) Date of Patent: Jul. 27, 2021

(54) ELECTRONIC DEVICE FOR RECOGNIZING SPEECH

(71) Applicant: Samsung Electronics Co., Ltd., Gyeonggi-do (KR)

(72) Inventors: Young Woo Lee, Seoul (KR); Ho Seon Shin, Seoul (KR); Sang Hoon Lee, Gyeonngi-do (KR)

(73) Assignee: Samsung Electronics Co., Ltd.

(*) Notice: Subject to any disclaimer, the term of this patent is extended or adjusted under 35 U.S.C. 154(b) by 68 days.

(21) Appl. No.: 15/866,072

(22) Filed: Jan. 9, 2018

(65) Prior Publication Data

US 2018/0197540 A1 Jul. 12, 2018

(30) Foreign Application Priority Data

Jan. 9, 2017 (KR) .......... 10-2017-0003085

(51) Int. Cl.

| | |
|---|---|
| G06F 1/16 | (2006.01) |
| G10L 15/22 | (2006.01) |
| G10L 17/00 | (2013.01) |
| G10L 17/02 | (2013.01) |
| G10L 17/04 | (2013.01) |
| G10L 17/16 | (2013.01) |
| G10L 17/18 | (2013.01) |

(Continued)

(52) U.S. Cl.
CPC .............. *G10L 15/22* (2013.01); *G10L 17/02* (2013.01); *G10L 17/04* (2013.01); *G10L 17/16* (2013.01); *G10L 17/18* (2013.01); *G10L 17/22* (2013.01); *G10L 21/0208* (2013.01); *G10L 21/0272* (2013.01); *G06F 1/163* (2013.01)

(58) Field of Classification Search
CPC ......... G10L 17/02; G10L 17/06; G10L 17/24; G10L 15/22
See application file for complete search history.

(56) References Cited

U.S. PATENT DOCUMENTS 5,414,755 A 5/1995 Bahler et al.
5,867,574 A 2/1999 Eryilmaz
(Continued)

FOREIGN PATENT DOCUMENTS

EP 0 643 520 3/1995
EP 2 669 889 12/2013
(Continued)

OTHER PUBLICATIONS

An Algorithm for Determining the Endpoints for Isolated Utterances, The Bell System Technical Jounal, vol. 54, No. 2, Feb. 1975, pp. 297-315.
(Continued)

*Primary Examiner* — Daniel C Washburn
*Assistant Examiner* — Oluwadamilola M Ogunbiyi
(74) *Attorney, Agent, or Firm* — The Farrell Law Firm, P.C.

(57) ABSTRACT

An electronic device includes a microphone obtaining an audio signal, a memory in which a speaker model is stored, and at least one processor. The at least one processor is configured to obtain a voice signal from the audio signal, to compare the voice signal with the speaker model to verify a user, and, if a verification result indicates that the user corresponds to a pre-enrolled speaker, to perform an operation corresponding to the obtained voice signal.

18 Claims, 12 Drawing Sheets

(51) Int. Cl.
   *G10L 17/22*     (2013.01)
   *G10L 21/0208*   (2013.01)
   *G10L 21/0272*   (2013.01)

(56) References Cited

U.S. PATENT DOCUMENTS

| | | | | |
|---|---|---|---|---|
| 6,021,459 | A * | 2/2000 | Norman | G06F 12/0661 |
| | | | | 365/230.03 |
| 6,453,041 | B1 | 9/2002 | Eryilmaz | |
| 6,496,800 | B1 * | 12/2002 | Kong | G10L 17/24 |
| | | | | 704/239 |
| 6,574,592 | B1 * | 6/2003 | Nankawa | G10L 25/78 |
| | | | | 704/206 |
| 6,615,170 | B1 | 9/2003 | Liu et al. | |
| 6,718,301 | B1 * | 4/2004 | Woods | G10L 25/78 |
| | | | | 704/226 |
| 6,754,631 | B1 * | 6/2004 | Din | G10L 15/26 |
| | | | | 704/270 |
| 7,693,000 | B2 * | 4/2010 | Taruishi | G11C 7/1096 |
| | | | | 365/230.03 |
| 9,318,129 | B2 | 4/2016 | Vasilieff et al. | |
| 9,343,068 | B2 | 5/2016 | Yun et al. | |
| 9,619,200 | B2 | 4/2017 | Chakladar et al. | |
| 9,779,732 | B2 | 10/2017 | Lee et al. | |
| 2002/0064158 | A1 * | 5/2002 | Yokoyama | G10L 25/69 |
| | | | | 370/394 |
| 2002/0181669 | A1 * | 12/2002 | Takatori | G10L 15/26 |
| | | | | 379/88.06 |
| 2004/0107100 | A1 * | 6/2004 | Lu | G10L 17/00 |
| | | | | 704/238 |
| 2004/0162724 | A1 * | 8/2004 | Hill | G10L 15/1822 |
| | | | | 704/231 |
| 2005/0004710 | A1 * | 1/2005 | Shimomura | G06K 9/00281 |
| | | | | 700/246 |
| 2005/0105716 | A1 * | 5/2005 | Das | H04Q 1/46 |
| | | | | 379/376.02 |
| 2005/0171664 | A1 * | 8/2005 | Konig | G10L 15/22 |
| | | | | 701/36 |
| 2006/0224382 | A1 * | 10/2006 | Taneda | G10L 21/0208 |
| | | | | 704/233 |
| 2007/0021958 | A1 * | 1/2007 | Visser | G10L 21/0272 |
| | | | | 704/226 |
| 2007/0037536 | A1 * | 2/2007 | Battaglini | H04M 1/247 |
| | | | | 455/212 |
| 2008/0154585 | A1 * | 6/2008 | Yoshioka | G10L 25/87 |
| | | | | 704/213 |
| 2008/0172230 | A1 * | 7/2008 | Hayakawa | G10L 17/14 |
| | | | | 704/249 |
| 2008/0195387 | A1 * | 8/2008 | Zigel | G10L 17/06 |
| | | | | 704/236 |
| 2008/0282154 | A1 * | 11/2008 | Nurmi | G06F 3/0237 |
| | | | | 715/261 |
| 2009/0125304 | A1 * | 5/2009 | Cho | G10L 25/78 |
| | | | | 704/233 |
| 2009/0143139 | A1 * | 6/2009 | Fawcett | G10H 7/006 |
| | | | | 463/35 |
| 2010/0022283 | A1 * | 1/2010 | Terlizzi | H04M 1/05 |
| | | | | 455/570 |
| 2010/0183140 | A1 * | 7/2010 | Cheng | H04M 9/082 |
| | | | | 379/406.03 |
| 2010/0217594 | A1 * | 8/2010 | Sawada | G10L 17/04 |
| | | | | 704/246 |
| 2010/0280641 | A1 * | 11/2010 | Harkness | H04N 21/4394 |
| | | | | 700/94 |
| 2010/0310086 | A1 * | 12/2010 | Magrath | G10K 11/178 |
| | | | | 381/71.11 |
| 2012/0089393 | A1 * | 4/2012 | Tanaka | G10L 25/87 |
| | | | | 704/231 |
| 2012/0239400 | A1 * | 9/2012 | Koshinaka | G10L 17/16 |
| | | | | 704/249 |
| 2013/0021459 | A1 | 1/2013 | Vasilieff et al. | |
| 2013/0253932 | A1 * | 9/2013 | Ariu | G10L 15/26 |
| | | | | 704/246 |
| 2013/0325484 | A1 | 12/2013 | Chakladar et al. | |
| 2014/0074467 | A1 * | 3/2014 | Ziv | G10L 25/78 |
| | | | | 704/235 |
| 2014/0180686 | A1 * | 6/2014 | Schuck | G10L 15/265 |
| | | | | 704/235 |
| 2014/0247926 | A1 * | 9/2014 | Gainsboro | G10L 15/22 |
| | | | | 379/88.01 |
| 2014/0278393 | A1 * | 9/2014 | Ivanov | G10L 15/20 |
| | | | | 704/233 |
| 2014/0358535 | A1 | 12/2014 | Lee et al. | |
| 2015/0019215 | A1 * | 1/2015 | Shin | G10L 15/20 |
| | | | | 704/233 |
| 2015/0081295 | A1 | 3/2015 | Yun et al. | |
| 2015/0336578 | A1 * | 11/2015 | Lord | B60T 7/22 |
| | | | | 701/2 |
| 2015/0340027 | A1 * | 11/2015 | Wang | G10L 15/07 |
| | | | | 704/221 |
| 2015/0340040 | A1 | 11/2015 | Mun et al. | |
| 2016/0018872 | A1 * | 1/2016 | Tu | G06F 1/3234 |
| | | | | 345/173 |
| 2016/0111084 | A1 | 4/2016 | Bang et al. | |
| 2016/0111112 | A1 * | 4/2016 | Hayakawa | G10L 25/45 |
| | | | | 704/239 |
| 2016/0118050 | A1 * | 4/2016 | Arslan | G10L 25/63 |
| | | | | 704/235 |
| 2016/0148615 | A1 * | 5/2016 | Lee | G06F 1/324 |
| | | | | 704/275 |
| 2016/0189733 | A1 | 6/2016 | Vasilieff et al. | |
| 2016/0232893 | A1 * | 8/2016 | Subhojit | G10L 15/07 |
| 2016/0240194 | A1 * | 8/2016 | Lee | G06F 1/3206 |
| 2016/0249132 | A1 * | 8/2016 | Oliaei | H04R 19/005 |
| 2016/0275952 | A1 * | 9/2016 | Kashtan | G10L 17/00 |
| 2016/0314790 | A1 * | 10/2016 | Tsujikawa | G10L 17/04 |
| 2017/0061968 | A1 * | 3/2017 | Dalmasso | G10L 17/08 |
| 2017/0069327 | A1 * | 3/2017 | Heigold | G10L 17/18 |
| 2017/0076727 | A1 * | 3/2017 | Ding | G10L 17/08 |
| 2017/0119615 | A1 * | 5/2017 | Shim | A61H 1/0266 |
| 2017/0155378 | A1 * | 6/2017 | Hu | G10L 25/78 |
| 2017/0162198 | A1 | 6/2017 | Chakladar et al. | |
| 2017/0294191 | A1 * | 10/2017 | Shi | G10L 15/20 |
| 2017/0323644 | A1 * | 11/2017 | Kawato | G10L 17/00 |
| 2018/0012585 | A1 * | 1/2018 | Qiao | G10K 11/178 |
| 2018/0025733 | A1 * | 1/2018 | Qian | G10L 17/22 |
| | | | | 704/275 |
| 2018/0082691 | A1 * | 3/2018 | Khoury | G10L 17/02 |
| 2018/0165878 | A1 * | 6/2018 | Khan | G06F 3/012 |
| 2018/0314689 | A1 * | 11/2018 | Wang | G06F 40/58 |
| 2018/0324293 | A1 * | 11/2018 | Davis | G10L 19/018 |
| 2018/0336479 | A1 * | 11/2018 | Guttmann | G06N 20/00 |

FOREIGN PATENT DOCUMENTS

| | | |
|---|---|---|
| KR | 10-2015-0133586 | 11/2015 |
| KR | 10-1610151 | 4/2016 |
| WO | WO 2015/038435 | 3/2015 |

OTHER PUBLICATIONS

European Search Report dated May 24, 2018 issued in counterpart application No. 17208265.3-1207, 9 pages.

* cited by examiner

ELECTRONIC DEVICE FOR RECOGNIZING SPEECH

PRIORITY

This application claims priority under 35 U.S.C. § 119(a) to Korean Patent Application No. 10-2017-0003085 filed in the Korean Intellectual Property Office on Jan. 9, 2017, the disclosure of which is incorporated herein by reference.

BACKGROUND

1. Field of the Disclosure

The present disclosure relates generally to a technology that recognizes a voice.

2. Description of the Related Art

With the development of speech recognition technology, electronic devices (e.g., smartphones) equipped with microphones have been widely distributed. A user's voice may be recognized through the speech recognition technology and an electronic device may perform various operations based on the recognized voice. For example, the electronic device may execute an application or search for information through a website, based on the recognized voice.

The electronic device may only recognize a voice when a physical input is applied. For example, the electronic device may recognize the voice only when the user touches an icon or a home key. However, a technology that recognizes the voice by using only a keyword has been recently developed even when the physical input is absent.

A user needs to store a predefined keyword in an electronic device to recognize a voice only using the keyword. In addition, the electronic device performs an operation corresponding to the keyword only when the user speaks the keyword stored in the electronic device. As described above, since the user needs to directly store a keyword and to speak the keyword to use the technology that recognizes a voice by using only a keyword, the user may be inconvenienced. Accordingly, a user may avoid using a speech recognition function.

SUMMARY

The present disclosure has been made to address at least the above problems and/or disadvantages and to provide at least the advantages described below. Accordingly, an aspect of the present disclosure provides an electronic device for solving the above-described problems.

According to another aspect of the present disclosure, a voice signal of a user is recognized without a keyword, thereby providing convenience for the user.

According to another aspect of the present disclosure, a low-power processor recognizes the voice signal of the user, thereby reducing power consumption of an electronic device.

In accordance with an aspect of the present disclosure an electronic device includes a microphone for obtaining an audio signal, a memory in which a speaker model is stored, and at least one processor. The at least one processor is configured to obtain a voice signal from the audio signal, to compare the voice signal with the speaker model to verify a user, and, if the verification result indicates that the user corresponds to a pre-enrolled speaker, to perform an operation corresponding to the obtained voice signal.

In accordance with an another aspect of the present disclosure, a wearable electronic device includes a sensor for sensing movement of a user, a microphone for obtaining an audio signal if the movement is sensed, a memory in which a speaker model is stored, and at least one processor. The at least one processor is configured to obtain a voice signal from the audio signal, to compare the voice signal with the speaker model to verify a user, and, if a verification result indicates that the user corresponds to a pre-enrolled speaker, to perform an operation corresponding to the obtained voice signal.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
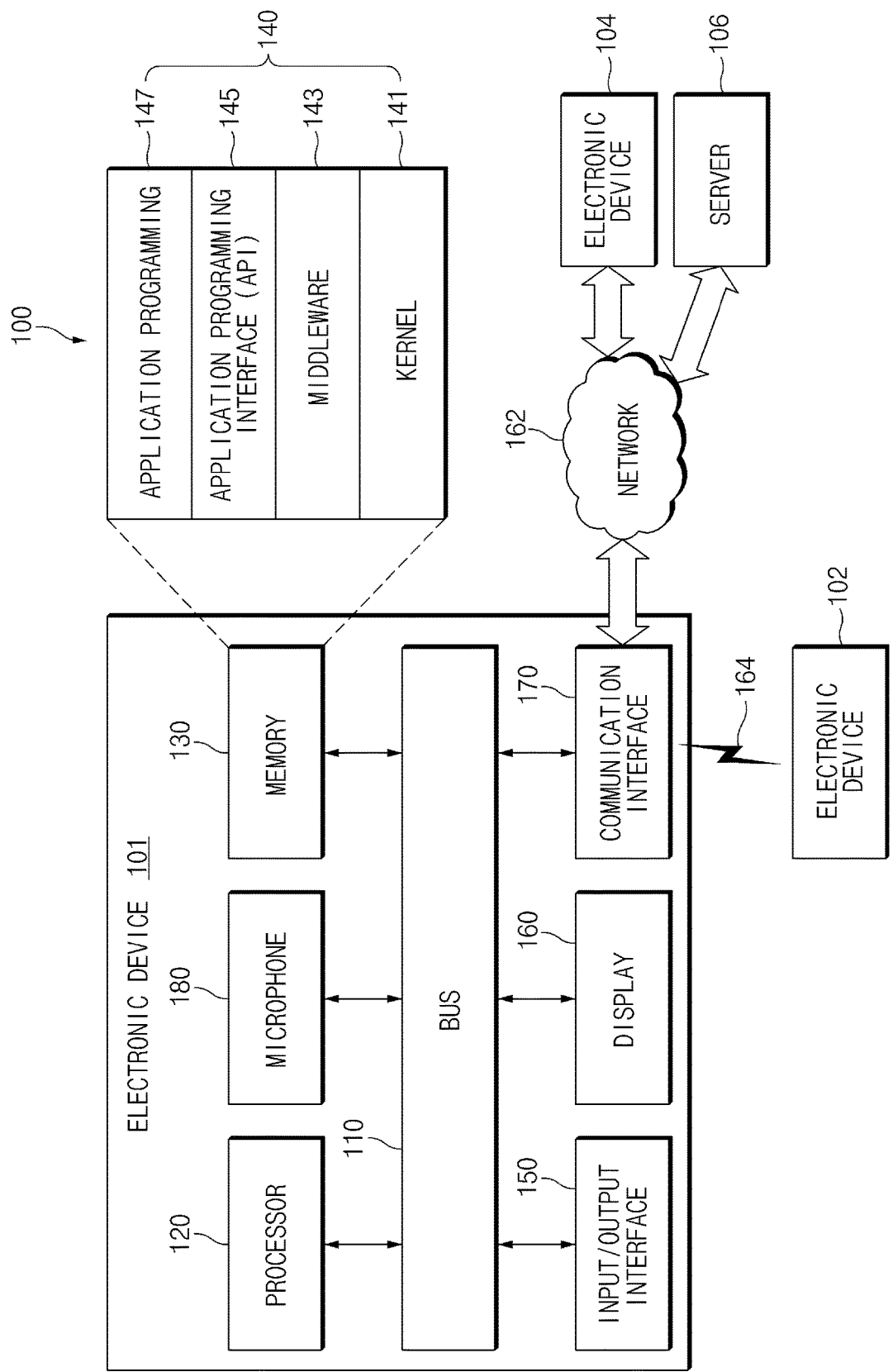
FIG. 1 illustrates an electronic device in a network environment, according to an embodiment of the present disclosure.

Embodiments of the present disclosure may be described with reference to accompanying drawings. The same or similar components may be designated by the same or similar reference numerals although they are illustrated in different drawings. Detailed descriptions of constructions or processes known in the art may be omitted to avoid obscuring the subject matter of the present disclosure.

In this disclosure, the expressions "have", "may have", "include", "comprise", "may include", or "may comprise", used herein, indicate the existence of corresponding features (e.g., numeric values, functions, operations, or components), but do not exclude one or more additional features.

In this disclosure, the expressions "A or B", "at least one of A and/or B", or "one or more of A and/or B", may include any and all combinations of one or more of the items listed. For example, the expressions "A or B", "at least one of A and B", and "at least one of A or B" refer to all of (1) including at least one A, (2) including at least one B, and (3) including both of at least one A and at least one B.

The expressions "first" and "second", used herein, may refer to various elements regardless of their order and/or the priority but do not limit the elements. For example, "a first user device" and "a second user device" indicate different user devices regardless of the order or priority. For example, a first element may be referred to as a second element, and similarly, a second element may be referred to as a first element without departing the scope of the present disclosure.

It will be understood that when an element (e.g., a first element) is referred to as being "(operatively or communicatively) coupled with/to" or "connected to" another element (e.g., a second element), the element may be directly coupled with/to or directly connected to the other element or an intervening element (e.g., a third element) may be present between them. In contrast, when an element (e.g., a first element) is referred to as being "directly coupled with/to" or "directly connected to" another element (e.g., a second element), it should be understood that there is no intervening element (e.g., a third element) between them.

The expression "configured to" used in this disclosure may be used interchangeably with the expressions "suitable for", "having the capacity to", "designed to", "adapted to", "made to", and "capable of". The term "configured to" may not only mean"specifically designed to" in hardware. Instead, the expression "a device configured to" may mean that the device is "capable of" operating together with another device or another component. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

Terms used in this disclosure describe specified embodiments and are not intended to limit the scope of the present disclosure. Terms of a singular form may include plural forms unless otherwise specified. All of the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined in the present disclosure. In some cases, even if terms are defined in this disclosure, they are not to be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. The wearable device may include at least one of an accessory type (e.g., watches, rings, bracelets, anklets, necklaces, glasses, contact lens, or head-mounted devices (HMDs), a fabric or garment-integrated type (e.g., electronic apparel), a body-attached type (e.g., a skin pad or tattoo), or a bio-implantable type (e.g., an implantable circuit).

According to various embodiments of the present disclosure, the electronic device may be a home appliance. A home appliance may include at least one of, for example, televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, and electronic picture frames.

According to an embodiment of the present disclosure, an electronic device may include at least one of various medical devices (e.g., various portable medical measurement devices (e.g., a blood glucose monitoring device, a heartbeat measuring device, a blood pressure measuring device, and a body temperature measuring device), a magnetic resonance angiography (MRA), a magnetic resonance imaging (MRI), a computed tomography (CT) machine, scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), points of sales (POSs) devices of stores, or Internet of Things (IoT) devices (e.g., light bulbs, various sensors, electric or gas meters, sprinkler devices, fire alarms, thermostats, street lamps, toasters, exercise equipment, hot water tanks, heaters, or boilers).

According to an embodiment of the present disclosure, the electronic device may include at least one of a part of furniture or buildings/structures, electronic boards, electronic signature receiving devices, projectors, or various types of measuring instruments (e.g., water meters, electricity meters, gas meters, or wave meters). An electronic device may be one of the above-described devices or a combination thereof. An electronic device may also be a flexible electronic device. Furthermore, an electronic device is not be limited to the above-described electronic devices and may include other electronic devices and new electronic devices according to the development of technologies in the future.

Hereinafter, electronic devices according to various embodiments of the present disclosure are described with reference to the accompanying drawings. In this disclosure, the term "user" may refer to a person who uses an electronic device or may refer to a device (e.g., an artificial intelligence electronic device) that uses the electronic device.

FIG. 1 illustrates an electronic device in a network environment, according to an embodiment of the present disclosure.

Referring to FIG. 1, an electronic device 101, a first electronic device 102, a second electronic device 104, or a server 106 may be connected each other over a network 162 or through short range communication 164. The electronic device 101 includes a bus 110, a processor 120, a memory 130, an input/output interface 150, a display 160, and a communication interface 170. The electronic device 101 may omit at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). The processor 120 may perform an arithmetic operation or data processing associated with control and/or communication of other elements of the electronic device 101.

The memory 130 may include a volatile and/or nonvolatile memory and may store instructions or data associated with at least one other element(s) of the electronic device 101. The memory 130 may store software and/or a program 140. The program 140 may include a kernel 141, a middleware 143, an application programming interface (API) 145, and/or an application program (or an application) 147. At least a part of the kernel 141, the middleware 143, or the API 145 may be referred to as an operating system (OS).

The kernel 141 may control or manage system resources (e.g., the bus 110, the processor 120, the memory 130, and the like) that are used to execute operations or functions of other programs (e.g., the middleware 143, the API 145, and the application 147). Furthermore, the kernel 141 may provide an interface that allows the middleware 143, the API 145, or the application 147 to access discrete elements of the electronic device 101 so as to control or manage system resources.

The middleware 143 may perform, for example, a mediation role such that the API 145 or the application 147 communicates with the kernel 141 to exchange data.

Furthermore, the middleware 143 may process task requests received from the application 147 according to a priority. For example, the middleware 143 may assign the priority, which makes it possible to use a system resource (e.g., the bus 110, the processor 120, or the memory 130) of the electronic device 101, to at least one of the application 147. For example, the middleware 143 may process the one or more task requests according to the priority assigned to the at least one of the applications, which makes it possible to perform scheduling or load balancing on the one or more task requests.

The API 145 may be, for example, an interface through which the application 147 controls a function provided by the kernel 141 or the middleware 143, and may include, for example, at least one interface or function (e.g., an instruction) for file control, window control, image processing, or character control.

The input/output interface 150 may play a role, for example, of an interface which transmits an instruction or data input from a user or another external device, to other element(s) 120 to 170 of the electronic device 101. Furthermore, the input/output interface 150 may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display various contents (e.g., a text, an image, a video, an icon, and a symbol) to a user. The display 160 may include a touch screen and may receive a touch, a gesture, a proximity input, or a hovering input using an electronic pen or a part of a user's body.

The communication interface 170 may establish communication between the electronic device 101 and a first electronic device 102, a second electronic device 104, or a server 106. For example, the communication interface 170 may be connected to the network 162 through wireless communication or wired communication to communicate with the second electronic device 104 or the server 106.

A microphone 180 may obtain an audio signal generated from a sound source. The sound source may be an object which generates a sound, such as a person, an animal, or a car. The audio signal may include a voice signal of a human and a noise (e.g., dog barking, a horn sound of a car), which is not the voice signal.

The wireless communication may use at least one of, for example, long-term evolution (LTE), LTE Advanced (LTE-A), code division multiple access (CDMA), wideband CDMA (WCDMA), universal mobile telecommunications system (UMTS), wireless broadband (WiBro), or global system for mobile communications (GSM), as cellular communication protocol. Furthermore, the wireless communication may include, for example, the short range communication 164. The short range communication 164 may include at least one of wireless fidelity (Wi-Fi), Bluetooth (BT), near field communication (NFC), magnetic stripe transmission (MST), or a global navigation satellite system (GNSS).

The MST may generate a pulse in response to transmission data using an electromagnetic signal, and the pulse may generate a magnetic field signal. The electronic device 101 may transfer the magnetic field signal to a POS device, and the POS device may detect the magnetic field signal using an MST reader. The POS device may recover the data by converting the detected magnetic field signal to an electrical signal.

The GNSS may include at least one of, for example, a global positioning system (GPS), a global navigation satellite system (Glonass), a Beidou navigation satellite system (Beidou), or a European global satellite-based navigation system (Galileo) based on an available region, or a bandwidth. Hereinafter, "GPS" and "GNSS" may be interchangeably used. The wired communication may include at least one of, for example, a universal serial bus (USB), a high definition multimedia interface (HDMI), a recommended standard-232 (RS-232), or a plain old telephone service (POTS). The network 162 may include at least one of a telecommunications network, such as a computer network (e.g., LAN or WAN), the Internet, or a telephone network.

Each of the first and second electronic devices 102 and 104 may be a device of which the type is different from or the same as that of the electronic device 101. According to an embodiment of the present disclosure, the server 106 may include a group of one or more servers. All or some of the operations performed by the electronic device 101 may be executed by the first electronic device 102, the second electronic device 104 or the server 106. In the case where the electronic device 101 executes any function or service automatically or in response to a request, the electronic device 101 may not perform the function or the service internally, but, alternatively and additionally, it may request at least a portion of a function associated with the electronic device 101 from another device (e.g., the first electronic device 102, the second electronic device 104, or the server 106). The other electronic device may execute the requested function or additional function and may transmit the execution result to the electronic device 101. The electronic device 101 may provide the requested function or service using the received result or may further process the received result to provide the requested function or service. To this end, for example, cloud computing, distributed computing, or client-server computing may be used.

Figure 2:
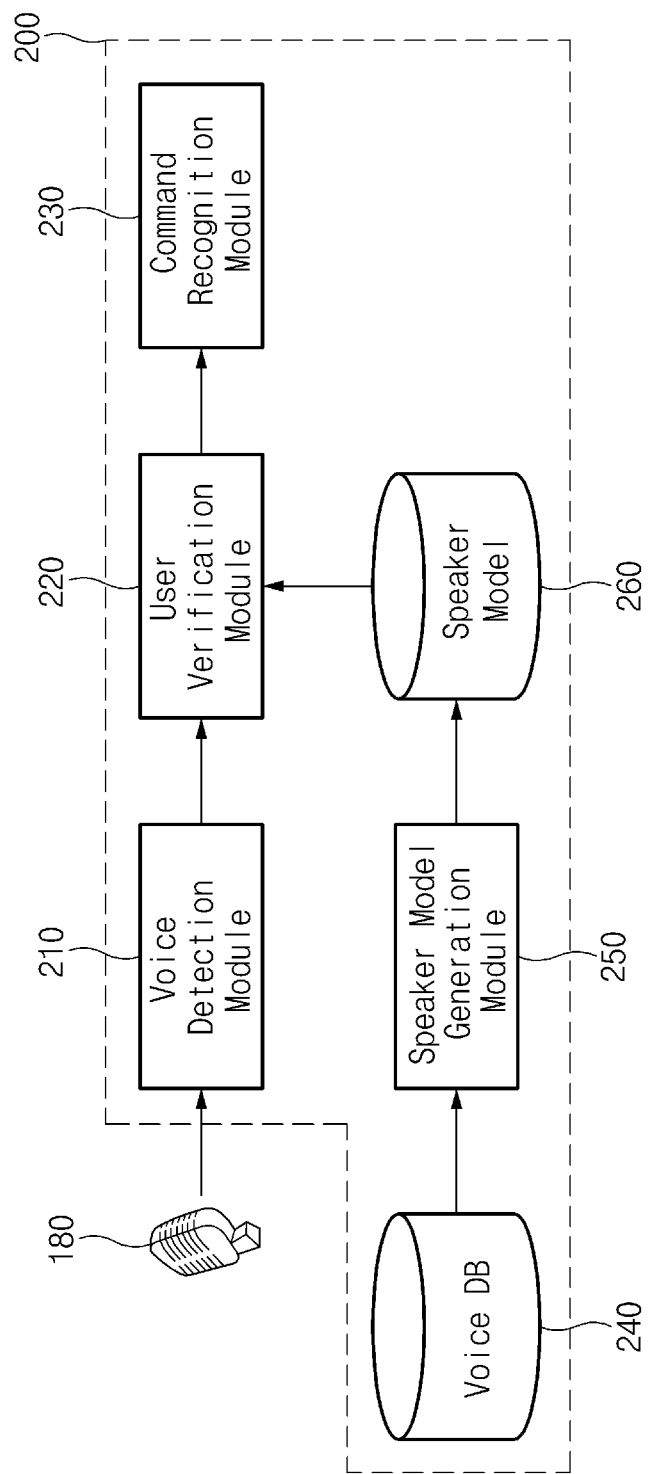
FIG. 2 illustrates a block diagram of program modules stored in an electronic device, according to an embodiment of the present disclosure.

FIG. 2 illustrates a block diagram of program modules stored in the electronic device 101, according to an embodiment of the present disclosure. The program modules illustrated in FIG. 2 may be executed by the processor 120 illustrated in FIG. 1 and may be stored in the memory 130.

Referring to FIG. 2, the program modules include a voice detection module 210, a user verification module 220, a command recognition module 230, a voice database 240, a speaker model generation module 250, and a speaker model 260.

The voice detection module 210 may obtain a voice signal from an audio signal input through the microphone 180. For example, a noise (e.g., a car sound or an animal sound) in addition to the voice signal of a person may be included in the audio signal input through the microphone 180. The voice detection module 210 may remove noise from the audio signal input through the microphone 180 to obtain only the voice signal.

The user verification module 220 may perform user verification based on the voice signal obtained by the voice detection module 210. For example, the user verification may be performed by comparing the obtained voice signal with a speaker model. If a verification result indicates that a user corresponds to a pre-enrolled speaker, the verification may be successful. If the verification result indicates that a user does not correspond to the pre-enrolled speaker, the verification may fail.

If the user verification is successful, the command recognition module 230 may obtain a command from the voice signal which is successfully verified. If the command is obtained, an electronic device may perform an operation corresponding to the command obtained by the command recognition module 230. For example, if a voice signal saying "How is the weather today?" is input and the user verification is successful, the electronic device may execute a weather application.

The voice database 240 may store the voice signal of the user under a specified condition. For example, when the user makes a call to another user, the voice database 240 may obtain and store the voice signal of the user.

The speaker model generation module 250 may generate the speaker model 260 based on the voice signal of the user stored in the voice database 240. For example, the speaker model generation module 250 may generate the speaker model 260 based on a feature value of the voice signal of the user. According to an embodiment of the present disclosure, a feature value may include at least one of linear prediction coding (LPC) and mel-frequency cepstral coefficients (MFCC).

The speaker model 260 may be a database storing the feature value of the voice signal.

According to embodiments of the present disclosure, details given with reference to FIGS. 1 and 2 may be identically applied to elements that have the same reference numerals as those of the electronic device 101 and program modules described with reference to FIGS. 1 and 2.

Figure 3:
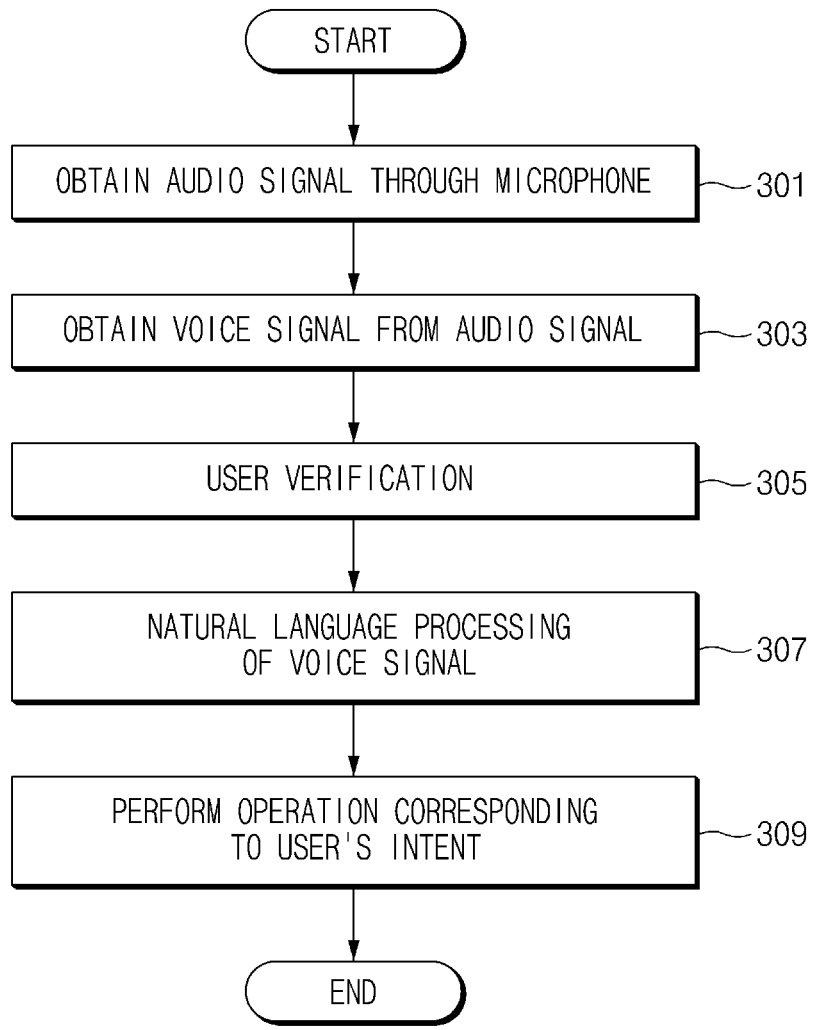
FIG. 3 illustrates a flowchart of an operation of an electronic device, according to an embodiment of the present disclosure.

FIG. 3 illustrates a flowchart of an operation of the electronic device 101, according to an embodiment of the present disclosure.

Referring to FIG. 3, in step 301, the processor 120 obtains an audio signal through the microphone 180. The audio signal may include noise, in addition to a voice signal.

According to an embodiment of the present disclosure, if the audio signal is obtained through the microphone 180, in step 303, the processor 120 (or the voice detection module 210 of FIG. 2) obtains a voice signal from the audio signal. For example, the processor 120 may determine that a signal having energy, the magnitude of which is greater than or equal to a critical value, of the audio signal is the voice signal, and may determine that a signal having energy, the magnitude of which is less than the critical value, of the audio signal is noise.

If the voice signal is obtained, in step 305, the processor 120 (or the user verification module 220 of FIG. 2) performs user verification. For example, the processor 120 may compare a feature value of the voice signal with a feature value of a speaker model; if a degree to which feature values coincide with each other is greater than or equal to a specific level, the processor 120 may determine that a user corresponds to a pre-enrolled speaker.

In step 307, the processor 120 (or the command recognition module 230 of FIG. 2) performs natural, language processing on the voice signal which is successfully verified, to grasp the user's intent. For example, if the voice signal, "Do you have a meeting on today's schedule?" is input, the processor 120 may perform natural language processing on the voice signal to grasp the user's intent.

If the user's intent is grasped, the processor 120 may match an operation corresponding to the user's intent. In the above-described exemplification, since the user's intent is "verify a schedule", an application associated with the schedule may be matched. Meanwhile, in an embodiment illustrated in FIGS. 1 to 3 as step 307 is performed by the electronic device 101. However, step 307 may be performed by a server.

If the user's intent is matched to the operation, in step 309, the processor 120 may perform an operation corresponding to the user's intent. In the above-described example, the processor 120 may perform the application associated with the schedule.

Figure 4:
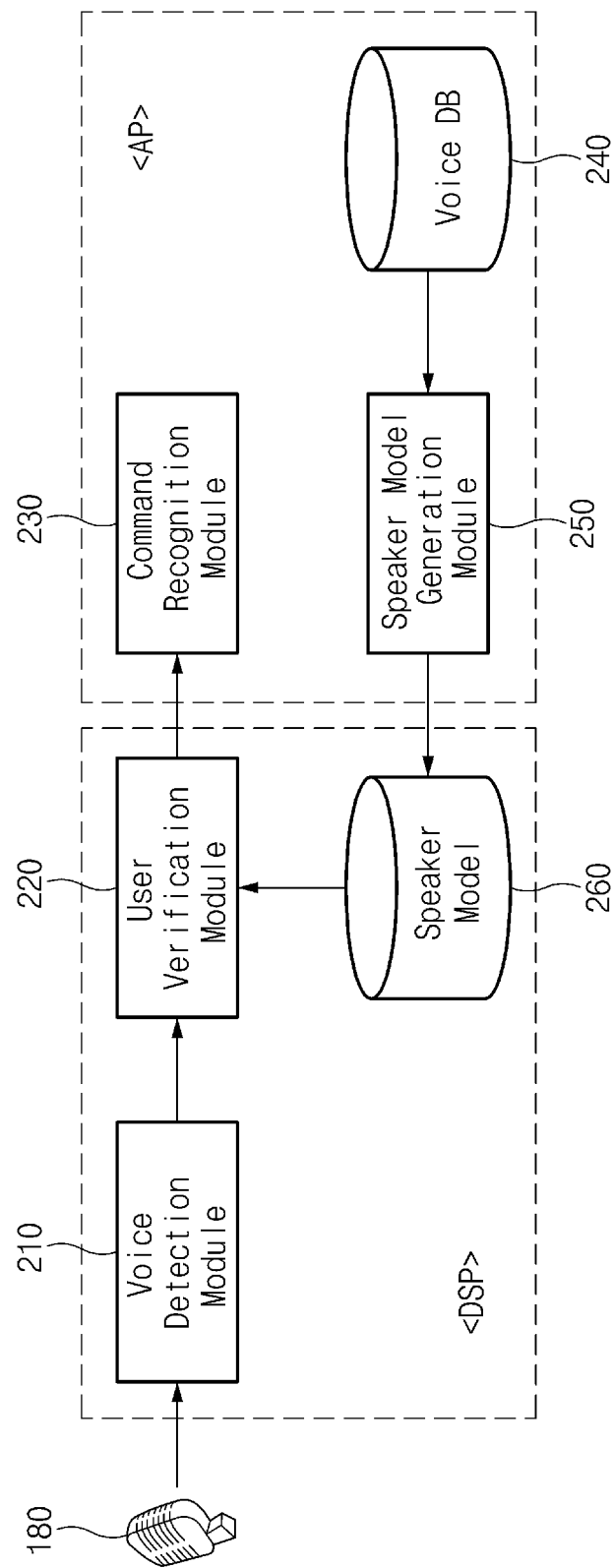
FIG. 4 illustrates program modules performed by at least one processor, according to an embodiment of the present disclosure.

FIG. 4 illustrates program modules performed by at least one processor, according to an embodiment of the present disclosure.

Referring to FIG. 4, at least one processor includes a digital signal processor (DSP) electrically connected to the microphone 180 and an AP electrically connected to the DSP.

The voice detection module 210 and the user verification module 220 may be performed by the DSP. According to an embodiment of the present disclosure, the DSP may obtain a voice signal from the audio signal input through the microphone 180 based on a zero crossing rate of the audio signal, or may obtain the voice signal based on a ratio (signal to noise ratio (SNR)) of a noise to the audio signal. In addition, the DSP may obtain the voice signal based on a distribution of the audio signal.

If the voice signal is obtained, the DSP may compare the voice signal with a speaker model stored in a memory to perform user verification. If the verification result indicates that a user corresponds to a pre-enrolled speaker, the DSP may change the state of the AP from a sleep state to an activation state. If the AP is activated, the AP may drive the command recognition module 230. The AP may obtain a command from the voice signal of the user. If the command is obtained, the AP may perform an operation corresponding to the command.

The speaker model generation module 250 may be executed by the AP, and the AP may allow the memory to store the voice database 240. For example, when the user makes a call to another user, the AP may obtain the voice signal through the microphone 180 and may store the voice signal in the memory.

The command recognition module 230 and the speaker model generation module 250 may be executed by a server, and the voice database 240 may be stored in the server. For example, the electronic device 101 may communicate with the server through a communication circuit. If the electronic device 101 transmits information about whether a user is verified, to the server, the server may obtain a command from the voice signal of the user to transmit the command to the electronic device 101 again. The electronic device 101 receiving the command may perform an operation corresponding to the command.

According to an embodiment of the present disclosure, a low-power processor recognizes the voice signal of the user, thereby reducing the power consumption of the electronic device 101.

Figure 5:
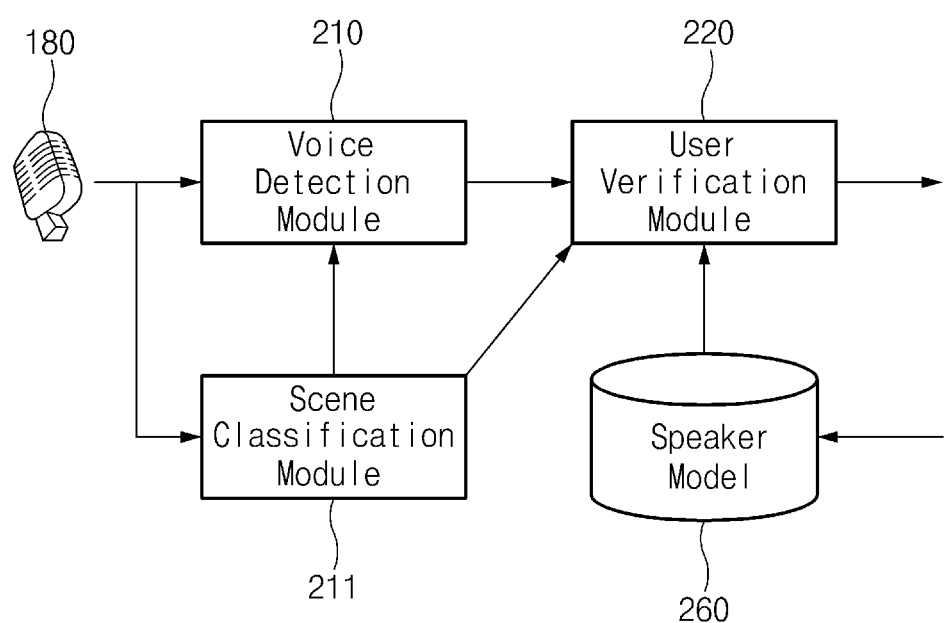
FIG. 5 illustrates program modules that obtain a voice signal by using a scene classification module, according to an embodiment of the present disclosure.

FIG. 5 illustrates program modules that obtain a voice signal by using a scene classification module, according to an embodiment of the present disclosure.

Referring to FIG. 5, a scene classification module 211 may classify an audio signal input through the microphone 180 into a plurality of scenes to obtain a voice signal. For example, when the audio signal is input through the microphone 180, the scene classification module 211 may classify whether a scene is a user speaking or whether the scene is noise input. If the scene is the user speaking, the scene classification module 211 may obtain the voice signal through the microphone 180. If the scene is noise input, the scene classification module 211 may not receive the audio signal through the microphone 180.

According to an embodiment of the present disclosure, the scene classification module 211 may classify a scene in which the user speaks, a scene in which noise is input while speaking, a scene in which only the noise is input, and a scene in which music is played, to obtain the voice signal. If the voice signal is obtained by the scene classification module 211, the user verification module 220 may perform user verification. For example, an operation in which the user verification module 220 verifies the user may correspond to an operation described in FIG. 2.

The scene classification module 211 may obtain the voice signal based on a distribution of the audio signal input through the microphone 180. For example, if the distribution of the audio signal is similar to a distribution in a noise scene, the scene classification module 211 may not receive the audio signal through the microphone 180.

Figure 6:
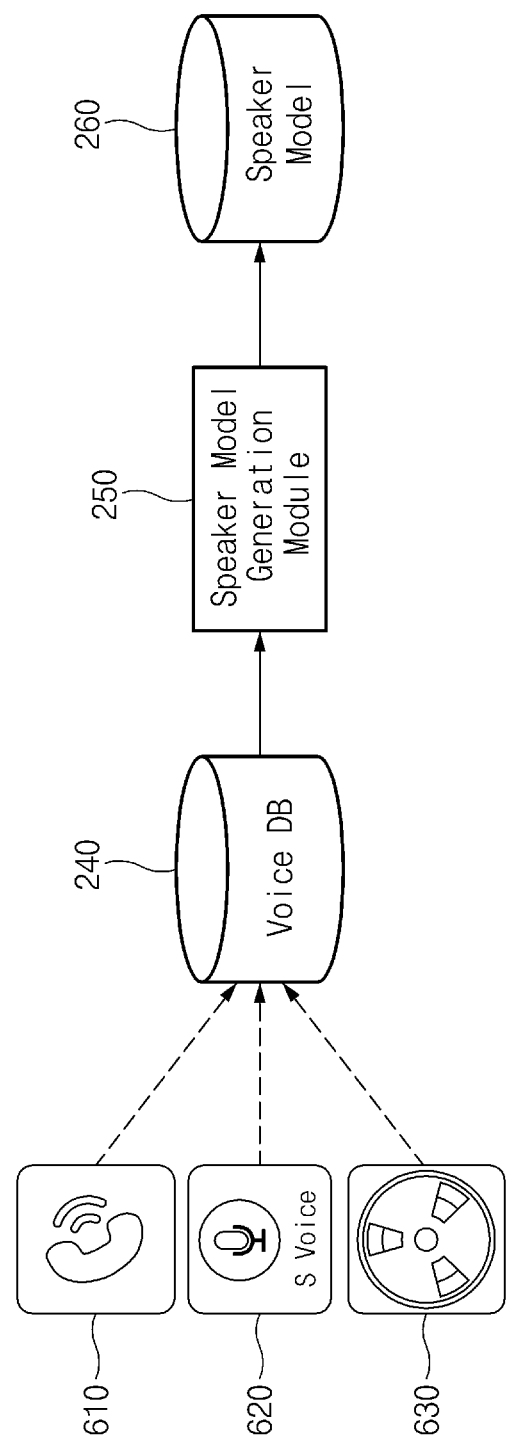
FIG. 6 illustrates a block diagram of program modules that enroll a speaker model, according to an embodiment of the present disclosure.

FIG. 6 illustrates a block diagram of program modules that enroll a speaker model, according to an embodiment of the present disclosure.

Referring to FIG. 6, the voice database 240 may store a voice signal obtained through the microphone 180, under a specified condition. For example, in the case where the electronic device 101 transmits a call to an external device, the voice database 240 may obtain the voice signal obtained through the microphone 180. If a speech recognition application or a recording application is executed, the voice database 240 may store the voice signal obtained through the microphone 180.

The speaker model generation module 250 may normalize a feature value of the voice signal stored in the voice database 240 to generate the speaker model 260. For example, the speaker model generation module 250 may divide the voice signal into a plurality of specified sections to extract a feature value from each of the sections. The speaker model generation module 250 may normalize the feature value extracted from each of the sections to generate the speaker model 260.

Figure 7:
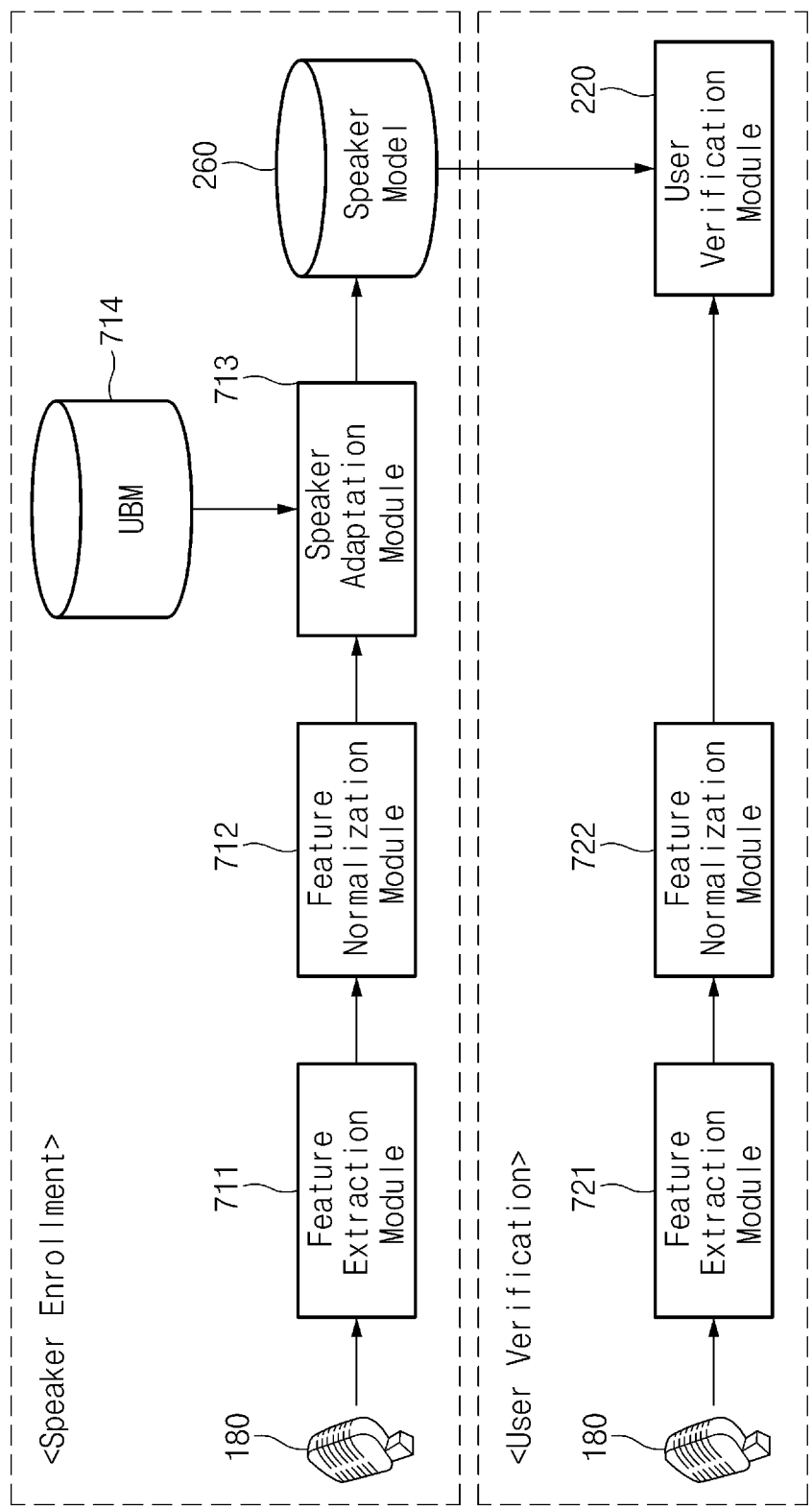
FIG. 7 illustrates a block diagram of program modules that enroll a speaker model and verify a user, according to an embodiment of the present disclosure.

FIG. 7 illustrates a block diagram of program modules that enroll a speaker model and verify a user, according to an embodiment of the present disclosure.

Referring to FIG. 7, a feature extraction module 711 may extract a feature value from a voice signal obtained through the microphone 180. If the feature value is extracted, a feature normalization module 712 may change a feature value depending on a specific rule. According to an embodiment of the present disclosure, the feature normalization module 712 may change feature values within a specific range depending on a specific rule to transmit changed feature values to a speaker adaptation module 713. The speaker adaptation module 713 may generate the speaker model 260 based on the normalized feature value and a universal background model (UBM) 714. For example, the speaker adaptation module 713 may calculate the similarity between the normalized feature value and the UBM 714 to generate the speaker model 260.

The speaker model 260 generated by the speaker adaptation module 713 may be stored in a memory. The user verification module 220 may perform user verification based on the speaker model 260 stored in the memory. According to an embodiment of the present disclosure, a feature extraction module 721 may extract the feature value of the voice signal. A feature normalization module 722 may change a feature value depending on a specific rule. The user verification module 220 may perform user verification based on the normalized feature value. For example, the user verification module 220 may perform the user verification by using at least one of a hidden Markov model (HMM), a Gaussian mixture model (GMM), a support vector machine (SVM), an i-vector, probabilistic linear discriminant analysis (PLDA), and a deep neural network (DNN).

Figure 8:
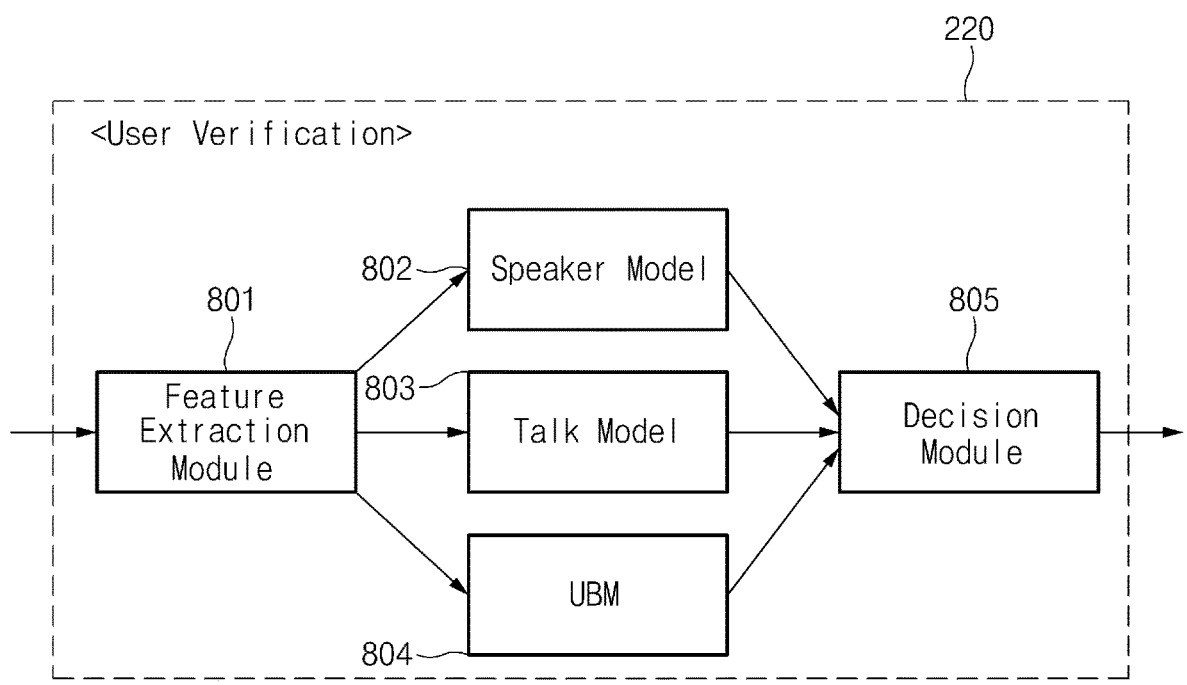
FIG. 8 illustrates a user verification module that verifies a user based on a talk model and a universal background model (UBM), according to an embodiment of the present disclosure.

FIG. 8 illustrates a user verification module that verifies a user based on a talk model and a UBM, according to an embodiment of the present disclosure.

Referring to FIG. 8, the user verification module 220 includes a feature extraction module 801, a speaker model 802, a talk model 803, a UBM 804, and/or a decision module 805. The user verification module 220 may extract a feature value by using the feature extraction module 801 and may determine a user based on the similarity between the models. For example, if the similarity between a feature value of a voice signal input from the microphone 180 and the speaker model 802 of speaker "A" is greater than or equal to a specific level, the decision module 805 may determine that the user is "A".

According to an embodiment of the present disclosure, the user verification module 220 may determine the user based on the similarity between the feature value and the talk model 803, and the similarity between the feature value and the UBM 804. The talk model 803 may be a model associated with talk contents between a pre-enrolled speaker and another speaker. For example, if a voice signal obtained through a talk between "A" and "B" is input through the microphone 180 and the similarity between the feature value of the voice signal and the talk model 803 is greater than or equal to the specific level, the decision module 805 may determine that a current scene is a talk scene. If the similarity between the feature value of the voice signal and the speaker model 802 of speaker "A" is greater than or equal to the specific level, the decision module 805 may determine that the user is "A".

According to an embodiment of the present disclosure, user verification may be performed based on the talk model 803 and the UBM 804, thereby reducing the likelihood of an error occurring during the user verification.

Figure 9:
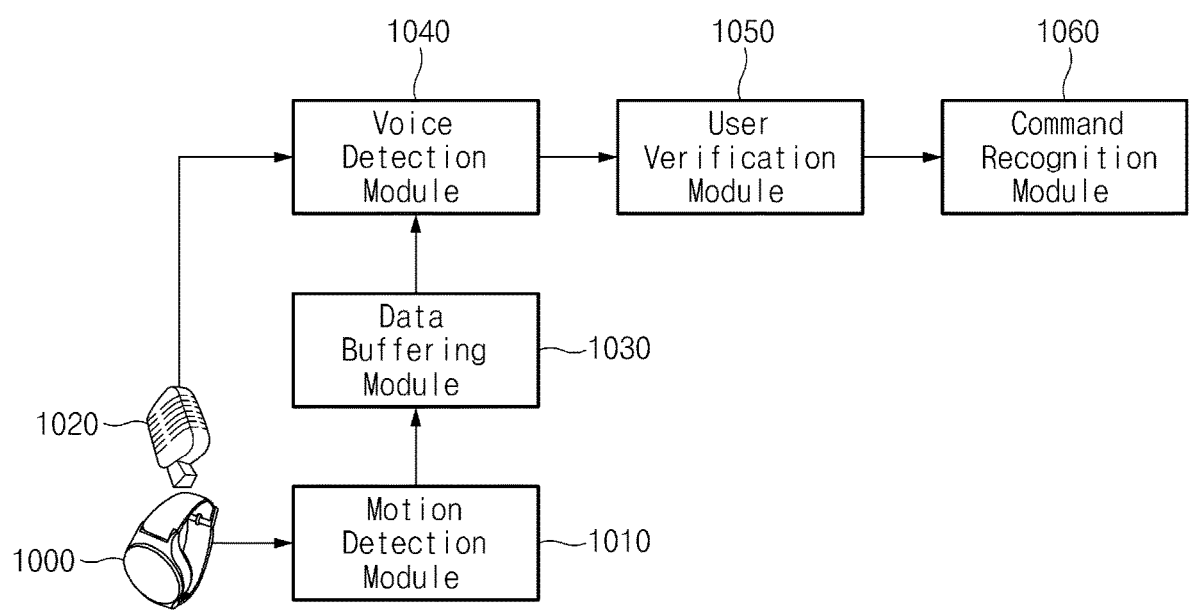
FIG. 9 illustrates a block diagram of program modules stored in a wearable electronic device, according to an embodiment of the present disclosure.

FIG. 9 illustrates a block diagram of program modules stored in a wearable electronic device, according to an embodiment of the present disclosure.

Referring to FIG. 9, a wearable electronic device 1000 includes a sensor, a microphone 1020, a memory, and at least one processor. At least one or more program modules may include a motion detection module 1010, a data buffering module 1030, a voice detection module 1040, a user verification module 1050, and a command recognition module 1060. Operations of the program modules illustrated in FIG. 9 may be performed by at least one processor included in the wearable electronic device 1000 and may be stored in the memory.

The motion detection module 1010 may sense the movement of a user. For example, the wearable electronic device 1000 may be worn on the user's wrist and if the user moves his/her wrist, the motion detection module 1010 may sense the movement. The motion detection module 1010 may determine whether the user moves, based on a signal sensed by the sensor. The sensor may include at least one of an acceleration sensor, a gyro sensor, a gravity sensor, and a geomagnetic sensor.

If the movement of the user is sensed, the microphone 1020 may obtain a voice signal. For example, if the user brings his/her wrist near his/her mouth to enter the voice signal, the microphone 1020 may obtain the voice signal.

If the movement of the user is sensed, the data buffering module 1030 may allow the voice detection module 1040 to obtain the voice signal after a preset time from a point in time when the movement is sensed. For example, in an operation in which the user brings his/her wrist near (i.e., over) his/her mouth to enter the voice signal, the data buffering module 1030 may transmit a buffering signal to the voice detection module 1040 from a point in time when the user moves his/her wrist to a point in time when the wrist is located over the mouth. If the user's wrist is located over his/her mouth, the data buffering module 1030 may interrupt an operation of transmitting the buffering signal to the voice detection module 1040. According to an embodiment of the present disclosure, the buffering signal may be transmitted before the voice signal is input, thereby minimizing a time when noise is input.

According to an aspect of the present disclosure, the voice detection module 1040, the user verification module 1050, and the command recognition module 1060 may correspond to the voice detection module 210, the user verification module 220, and the command recognition module 230 that are described in FIG. 2.

Figure 10:
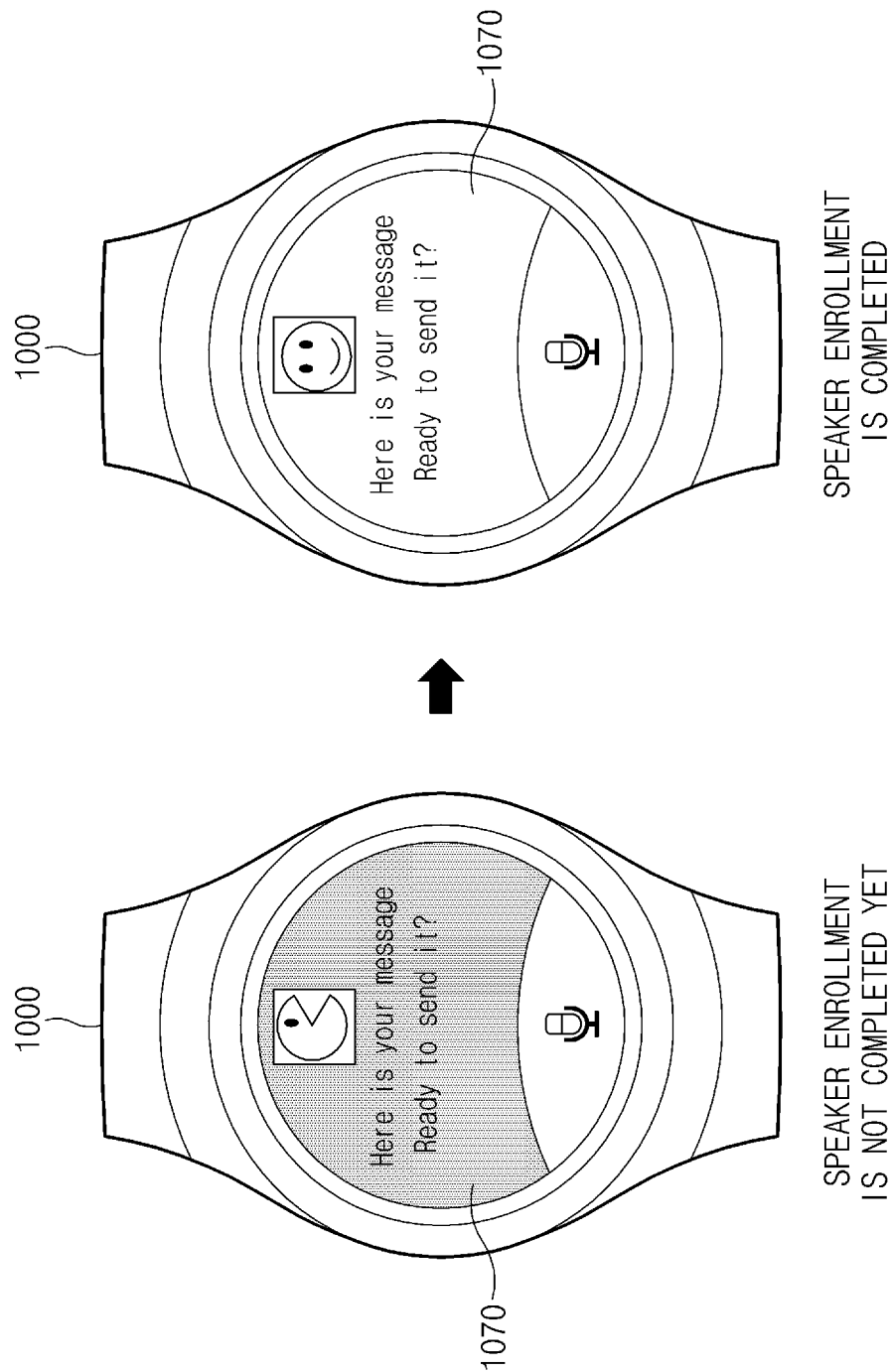
FIG. 10 illustrates a wearable electronic device that outputs information to a display about whether a speaker model is generated, according to an embodiment of the present disclosure.

FIG. 10 illustrates a wearable electronic device that outputs information to a display about whether a speaker model is generated, according to an embodiment of the present disclosure.

Referring to FIG. 10, the wearable electronic device 1000 may generate a speaker model based on a voice signal of a user stored in a voice database. If the speaker model is generated, the wearable electronic device 1000 may output information about whether the speaker model is generated, to a display 1070. For example, a character output to the display 1070, a message output to the display 1070, or the brightness of the display 1070, may be changed based on information before the speaker model is generated and information after the speaker model is generated. According to an embodiment of the present disclosure, the character output to the display 1070, the message output to the display 1070, and the brightness of the display 1070, may be adjusted to notify the user of whether the speaker model is generated, thereby providing the user with convenience.

According to an embodiment of the present disclosure, an electronic device includes a microphone obtaining an audio signal, a memory in which a speaker model is stored, and at least one processor. The at least one processor may be configured to obtain a voice signal from the audio signal, to compare the voice signal with the speaker model to verify a user, and, if a verification result indicates that the user corresponds to a pre-enrolled speaker, to perform an operation corresponding to the obtained voice signal.

According to an embodiment of the present disclosure, the at least one processor includes a DSP electrically connected to the microphone and an AP electrically connected to the DSP. The DSP may perform an operation of verifying the user and changes a state of the AP from a sleep state to an activation state if a verification result indicates the user is the pre-enrolled speaker, and the AP may recognize a command from the obtained voice signal and performs an operation associated with the command.

According to an embodiment of the present disclosure, the at least one processor may be configured to determine that a signal having energy, a magnitude of which is greater than or equal to a critical value, in the audio signal is the voice signal and to determine that a signal having energy, the magnitude of which is less than the critical value is a noise.

According to an embodiment of the present disclosure, the at least one processor may be configured to obtain the voice signal based on a zero crossing rate of the audio signal.

According to an embodiment of the present disclosure, the at least one processor may be configured to obtain the voice signal based on a signal to noise ratio SNR According to an embodiment of the present disclosure, the at least one processor may be configured to obtain the voice signal based on a distribution of the audio signal.

According to an embodiment of the present disclosure, the at least one processor may be configured to compare a feature value of the voice signal with a feature value of the speaker model to verify the user.

According to an embodiment of the present disclosure, at least one of the feature value of the voice signal and the feature value of the speaker model may include at least one of LPC and MFCC.

According to an embodiment of the present disclosure, the at least one processor may be configured to verify the user by using at least one of an HMM, a GMM, an SVM, a PLDA, and a DNN.

According to an embodiment of the present disclosure, the at least one processor may be configured to verify the user based on a similarity between the speaker model and a UBM.

According to an embodiment of the present disclosure, the at least one processor may be configured to verify the user based on a similarity between the speaker model and a talk model associated with talk contents between the pre-enrolled speaker and another speaker.

According to an embodiment of the present disclosure, the at least one processor may be configured to obtain the voice signal through the microphone under a specified condition and to normalize a feature value of the obtained voice signal to generate the speaker model.

According to an embodiment of the present disclosure, the at least one processor may be configured, if the electronic device transmits a call to an external device, to obtain the voice signal through the microphone.

According to an embodiment of the present disclosure, the at least one processor may be configured, if a recording application is executed, to obtain the voice signal through the microphone.

According to an embodiment of the present disclosure, the at least one processor may be configured to output information about whether the speaker model is generated, through a display.

According to an embodiment of the present disclosure, a wearable electronic device may include a sensor sensing movement of a user, a microphone obtaining an audio signal if the movement is sensed, a memory in which a speaker model is stored, and at least one processor. The at least one processor may be configured to obtain a voice signal from the audio signal, to compare the voice signal with the speaker model to verify a user, and, if a verification result indicates that the user corresponds to a pre-enrolled speaker, to perform an operation corresponding to the obtained voice signal.

According to an embodiment of the present disclosure, if the movement is sensed, the sensor may transmit buffering data to the microphone.

According to an embodiment of the present disclosure, the microphone may obtain the audio signal after a preset time from a point in time when the movement is sensed.

According to an embodiment of the present disclosure, the sensor may include at least one of an acceleration sensor, a gyro sensor, a gravity sensor, and a geomagnetic sensor.

According to an embodiment of the present disclosure, the at least one processor may be configured to normalize a feature value of the obtained voice signal to generate the speaker model and to output information about whether the speaker model is generated, to a display.

Figure 11:
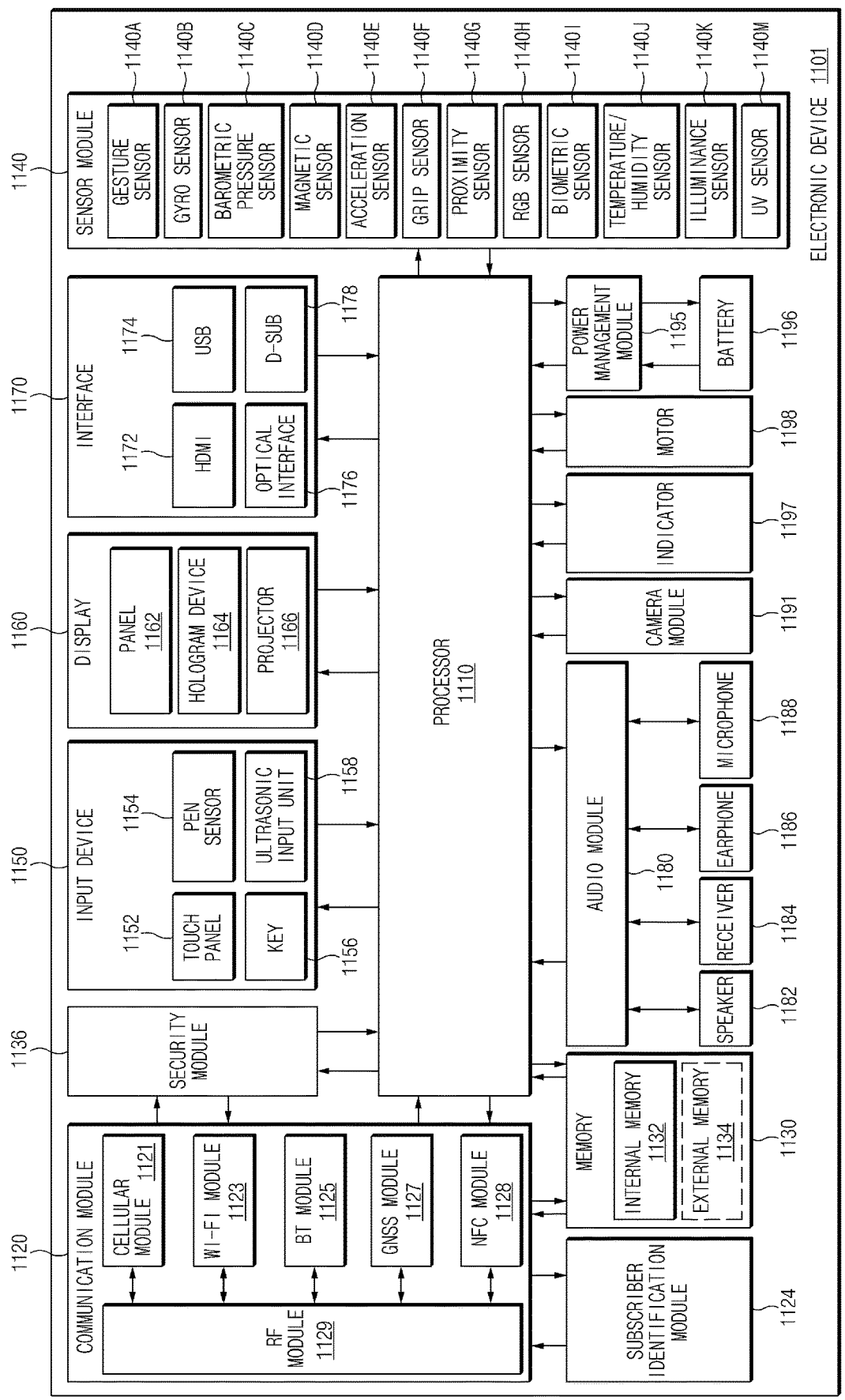
FIG. 11 is a block diagram of the electronic device, according to an embodiment of the present disclosure.

FIG. 11 illustrates a block diagram of an electronic device, according to an embodiment of the present disclosure.

Referring to FIG. 11, an electronic device 1101 may include, for example, all or a part of the electronic device 101 described above with reference to FIG. 1. The electronic device 1101 in FIG. 11 includes at least one AP 1110, a communication module 1120, a subscriber identification module card 1124, a memory 1130, a sensor module 1140, an input device 1150, a display 1160, an interface 1170, an audio module 1180, a camera module 1191, a power management module 1195, a battery 1196, an indicator 1197; and a motor 1198.

The processor 1110 may drive, for example, an OS or an application to control a plurality of hardware or software elements connected to the processor 1110 and may process and compute a variety of data. For example, the processor 1110 may be implemented with a system on chip (SoC). According to an embodiment of the present disclosure, the processor 1110 may further include a graphic processing unit (GPU) and/or an image signal processor. The processor 1110 may include at least a part (e.g., a cellular module 1121) of the elements illustrated in FIG. 11. The processor 1110 may load an instruction or data, which is received from at least one of the other elements (e.g., a nonvolatile memory), into a volatile memory and process the loaded instruction or data. The processor 1110 may store a variety of data in the nonvolatile memory.

The communication module 1120 may be configured the same as or similar to the communication interface 170 of FIG. 1. The communication module 1120 includes a cellular module 1121, a WiFi module 1123, a BT module 1125, a GNSS module 1127 (e.g., a GPS module, a Glonass module, a Beidou module, or a Galileo module), an NFC module 1128, and a radio frequency (RF) module 1129.

The cellular module 1121 may provide, for example, voice communication, video communication, a character service, an Internet service, or the like over a communication network. According to an embodiment, the cellular module 1121 may perform discrimination and authentication of the electronic device 1101 within a communication network by using the subscriber identification module (e.g., a SIM) card 1124. According to an embodiment, the cellular module 1121 may perform at least a portion of functions that the processor 1110 provides. According to an embodiment, the cellular module 1121 may include CP.

Each of the Wi-Fi module 1123, the BT module 1125, the GNSS module 1127, and the NFC module 1128 may each include a processor for processing data exchanged through a corresponding module, for example. According to an embodiment of the present disclosure, at least a part (e.g., two or more) of the cellular module 1121, the WiFi module 1122, the BT module 1125, the GNSS module 1127, and the NFC module 1128 may be included within one integrated circuit (IC) or an IC package.

The RF module 1129 may transmit and receive a communication signal (e.g., an RF signal). For example, the RF module 1129 may include a transceiver, a power amplifier module (PAM), a frequency filter, a low noise amplifier (LNA), and an antenna. At least one of the cellular module 1121, the WiFi module 1123, the BT module 1125, the GNSS module 1127, or the NFC module 1128 may transmit and receive an RF signal through a separate RF module.

The subscriber identification module card 1124 may include, for example, an embedded SIM and may include unique identify information (e.g., integrated circuit card identifier (ICCID)) or subscriber information (e.g., integrated mobile subscriber identity (IMSI)).

The memory 1130 may include an internal memory 1132 or an external memory 1134. For example, the internal memory 1132 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable PROM (EEPROM), a mask ROM, a flash ROM, or a flash memory (e.g., a NAND flash memory or a NOR flash memory)), a hard drive, or a solid state drive (SSD).

The external memory 1134 may further include a flash drive such as a compact flash (CF) drive, a secure digital (SD) memory card, a micro SD (Micro-SD), a mini SD (Mini-SD), an extreme digital (xD), a multimedia card (MMC), or a memory stick. The external memory 1134 may be operatively and/or physically connected to the electronic device 1101 through various interfaces.

A security module 1136 may be a module that includes a storage space of which a security level is higher than that of the memory 1130 and may be a circuit that guarantees safe data storage and a protected execution environment. The security module 1136 may be implemented with a separate circuit and may include a separate processor. For example, the security module 1136 may be in a smart chip or an SD card, which is removable, or may include an embedded secure element (eSE) embedded in a fixed chip of the electronic device 1101. Furthermore, the security module 1136 may operate based on an OS that is different from the OS of the electronic device 1101. For example, the security module 1136 may operate based on java card open platform (JCOP) OS.

The sensor module 1140 may measure a physical quantity or may detect an operation state of the electronic device 1101. The sensor module 1140 may convert the measured or detected information to an electric signal. For example, the sensor module 1140 may include at least one of a gesture sensor 1140A, a gyro sensor 1140B, a barometric pressure sensor 1140C, a magnetic sensor 1140D, an acceleration sensor 1140E, a grip sensor 1140F, the proximity sensor 1140G, a color sensor 1140H (e.g., red, green, blue (RGB) sensor), a biometric sensor 1140I, a temperature/humidity sensor 1140J, an illuminance sensor 1140K, or an UV sensor 1140M. The sensor module 1140 may further include an electric nose (E-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1140 may further include a control circuit for controlling at least one or more sensors included therein. According to an embodiment of the present disclosure, the electronic device 1101 may further include a processor that is a part of the processor 1110 or independent of the processor 1110 and is configured to control the sensor module 1140. The processor may control the sensor module 1140 while the processor 1110 remains at a sleep state.

The input device 1150 may include, for example, a touch panel 1152, a (digital) pen sensor 1154, a key 1156, or an ultrasonic input device 1158. For example, the touch panel 1152 may use at least one of capacitive, resistive, infrared and ultrasonic detecting methods. Also, the touch panel 1152 may further include a control circuit and a tactile layer to provide a tactile reaction to a user.

The (digital) pen sensor 1154 may be, for example, a part of a touch panel or may include an additional sheet for recognition. The key 1156 may include, for example, a physical button, an optical key, or a keypad. The ultrasonic input device 1158 may detect (or sense) an ultrasonic signal, which is generated from an input device, through a microphone 1188 and may check data corresponding to the detected ultrasonic signal.

The display 1160 may include a panel 1162, a hologram device 1164, or a projector 1166. The panel 1162 may be the same as or similar to the display 160 illustrated in FIG. 1. The panel 1162 may be implemented, for example, to be flexible, transparent or wearable. The panel 1162 and the touch panel 1152 may be integrated into a single module. The hologram device 1164 may display a stereoscopic image in a space using a light interference phenomenon. The projector 1166 may project light onto a screen so as to display an image. For example, the screen may be arranged in the inside or the outside of the electronic device 1101. According to an embodiment of the present disclosure, the display 1160 may further include a control circuit for controlling the panel 1162, the hologram device 1164, and the projector 1166.

The interface 1170 may include, for example, an HDMI 1172, a USB 1174, an optical interface 1176, or a D-subminiature (D-sub) connector 1178. The interface 1170 may be included, for example, in the communication interface 170 illustrated in FIG. 1. Additionally or generally, the interface 1170 may include, for example, a mobile high definition link (MHL) interface, an SD card/MMC interface, or an Infrared Data Association (IrDA) standard interface.

The audio module 1180 may convert a sound and an electric signal in dual directions. At least a part of the audio module 1180 may be included, for example, in the input/output interface 150 illustrated in FIG. 1. The audio module 1180 may process, for example, sound information that is input or output through a speaker 1182, a receiver 1184, an earphone 1186, or the microphone 1188.

For example, the camera module 1191 may shoot a still image or a video. According to an embodiment of the present disclosure, the camera module 1191 may include at least one or more image sensors (e.g., a front sensor or a rear sensor), a lens, an image signal processor (ISP), or a flash (e.g., an LED or a xenon lamp).

The power management module 1195 may manage, for example, power of the electronic device 1101. According to an embodiment of the present disclosure, a power management IC (PMIC), a charger IC, or a battery gauge may be included in the power management module 1195. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier. The battery gauge may measure, for example, a remaining capacity of the battery 1196 and a voltage, current or temperature thereof while the battery is charged. The battery 1196 may include, for example, a rechargeable battery and/or a solar battery.

The indicator 1197 may display a specific state of the electronic device 1101 or a part thereof (e.g., the processor 1110), such as a booting state, a message state, and a charging state. The motor 1198 may convert an electrical signal into a mechanical vibration and may generate vibration and haptic effects. A processing device (e.g., a GPU) for supporting a mobile TV may be included in the electronic device 1101. The processing device for supporting the mobile TV may process media data according to the standards of digital multimedia broadcasting (DMB), digital video broadcasting (DVB), or MediaFlo™.

Each of the above-mentioned elements of the electronic device may be configured with one or more components, and the names of the elements may be changed according to the type of the electronic device. In various embodiments of the present disclosure, the electronic device may include at least one of the above-mentioned elements, and some elements may be omitted or other additional elements may be added. Furthermore, some of the elements of the electronic device may be combined with each other so as to form one entity, so that the functions of the elements may be performed in the same manner as before the combination.

Figure 12:
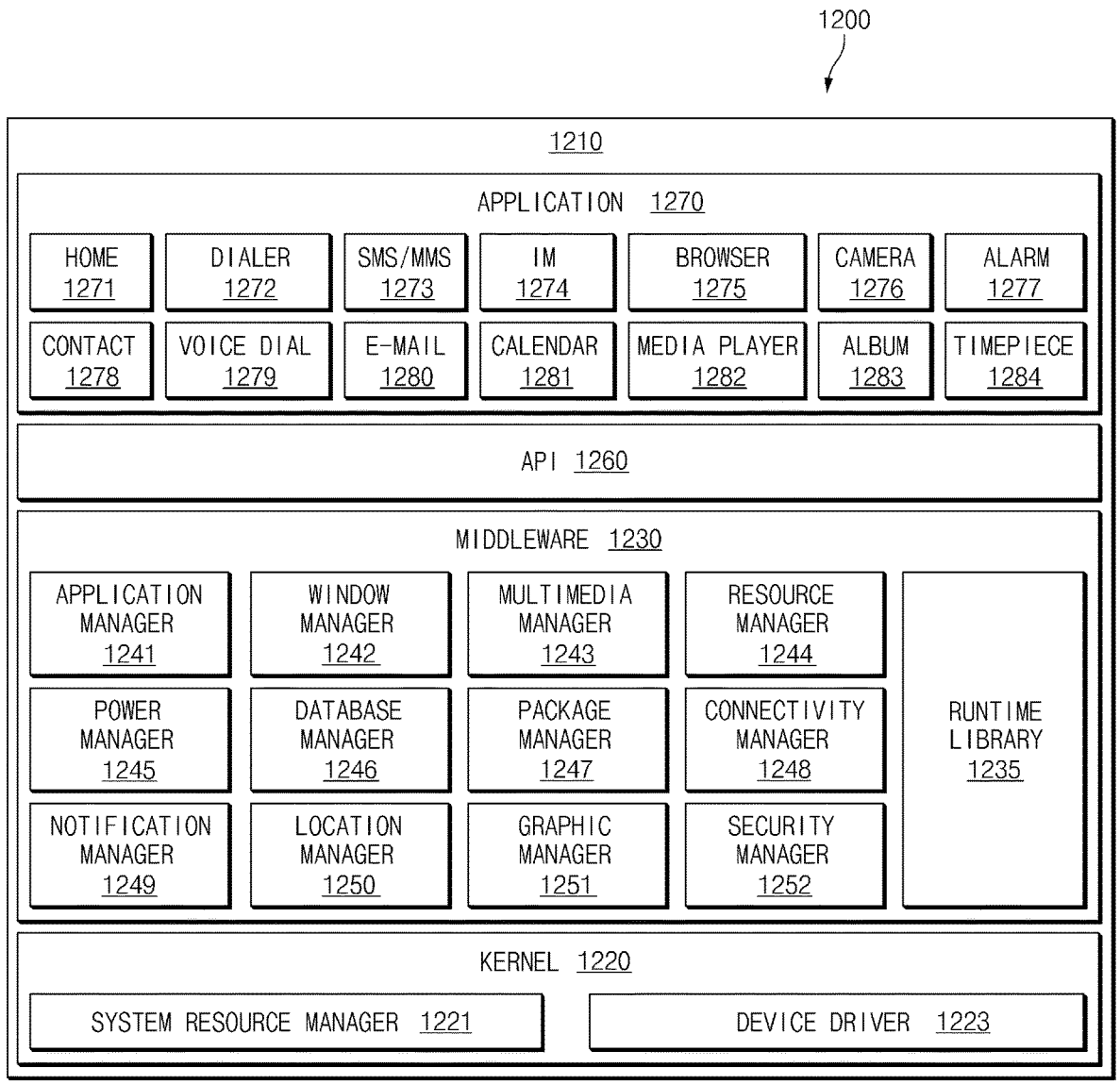
FIG. 12 is a block diagram of a program module, according to an embodiment of the present disclosure.

FIG. 12 illustrates a block diagram of a program module, according to an embodiment of the present disclosure.

A program module 1210 may include an OS to control resources associated with an electronic device 101, and/or diverse applications 147 driven on the OS. The OS may be, for example, Android™, iOS™, Windows™, Symbian™, or Tizen™.

The program module 1210 may include a kernel 1220, a middleware 1230, an API 1260, and/or an application 1270. At least a portion of the program module 1210 may be preloaded on an electronic device or may be downloadable from an external electronic device (e.g., the first electronic device 102, the second electronic device 104, or the server 106).

The kernel 1220 may include, for example, a system resource manager 1221 or a device driver 1223. The system resource manager 1221 may perform control, allocation, or retrieval of system resources. According to an embodiment of the present disclosure, the system resource manager 1221 may include a process managing unit, a memory managing unit, or a file system managing unit. The device driver 1223 may include, for example, a display driver, a camera driver, a Bluetooth driver, a shared memory driver, a USB driver, a keypad driver, a Wi-Fi driver, an audio driver, or an interprocess communication (IPC) driver.

The middleware 1230 may provide, for example, a function that is commonly required by the application 1270, or may provide diverse functions to the application 1270 through the API 1260 to allow the application 1270 to efficiently use limited system resources of the electronic device. According to an embodiment of the present disclosure, the middleware 1230 may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, a security manager 1252, or a payment manager 1254.

The runtime library 1235 may include a library module that is used by a compiler to add a new function through a programming language while the application 1270 is being executed. The runtime library 1235 may perform input/output management, memory management, or capacities about arithmetic functions.

The application manager 1241 may manage a life cycle of at least one application of the application 1270. The window manager 1242 may manage a graphic user interface (GUI) resource that is used in a screen. The multimedia manager 1243 may identify a format necessary for playing diverse media files, and may perform encoding or decoding of media files by using a codec suitable for the format. The resource manager 1244 may manage resources such as a storage space, memory, or source code of at least one application 1270.

The power manager 1245 may operate with a basic input/output system (BIOS) to manage a battery or power, and may provide power information for an operation of an electronic device 101. The database manager 1246 may generate, search for, or modify a database that is to be used in at least one application 1270. The package manager 1247 may install or update an application that is distributed in the form of a package file.

The connectivity manager 1248 may manage a wireless connection such as Wi-Fi or Bluetooth. The notification manager 1249 may display or notify an event such as an arrival message, an appointment, or a proximity notification in a mode that does not disturb a user. The location manager 1250 may manage location information about an electronic device 101. The graphic manager 1251 may manage a graphic effect that is provided to a user, or manage a user interface relevant thereto. The security manager 1252 may provide a general security function necessary for system security or user authentication. According to an embodiment of the present disclosure, in the case where the electronic device 101 includes a telephony function, the middleware 1230 may further include a telephony manager for managing a voice or video call function of the electronic device 101.

The middleware 1230 may include a middleware module that combines diverse functions of the above-described elements. The middleware 1230 may provide a module specialized to each type of OS to provide differentiated functions. Additionally, the middleware 1230 may dynamically remove a part of the preexisting elements or may add new elements thereto.

The API 1260 may be a set of programming functions and may be provided with a configuration that is variable depending on an OS. For example, in the case where an OS is the Android™ or the iOS™, it may provide one API set per platform. In the case where an OS is the Tizen™, it may provide two or more API sets per platform.

The application 1270 may include one or more applications capable of providing functions for a home application 1271, a dialer application 1272, an SMS/MMS application 1273, an instant message (IM) application 1274, a browser application 1275, a camera application 1276, an alarm application 1277, a contact application 1278, a voice dial application 1279, an e-mail application 1280, a calendar application 1281, a media player application 1282, an album application 1283, and a timepiece application 1284, or for offering health care information (e.g., measuring an exercise quantity or measuring blood sugar) or environment information (e.g., barometric pressure information, humidity information, or temperature information).

According to an embodiment, the application 1270 may include an information exchanging application to support information exchange between an electronic device and an external electronic device. The information exchanging application may include a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update) at least one function (e.g., turn-on/turn-off an external electronic device (or some elements) or adjust brightness (or resolution) of a display) of the external electronic device which communicates with the electronic device 101, an application running in the external electronic device, or a service (e.g., a call service or a message service) provided from the external electronic device.

According to an embodiment of the present disclosure, the application 1270 may include an application (e.g., a health care application of a mobile medical device) that is assigned in accordance with an attribute of an external electronic device. The application 1270 may include an application that is received from an external electronic device. The application 1270 may include a preloaded application or a third party application that is downloadable from a server. The names of elements of the program module 1210 may be modifiable depending on the kinds of OSs.

At least a portion of the program module 1210 may be implemented by software, firmware, hardware, or a combination of two or more thereof. At least a portion of the program module 1210 may be implemented (e.g., executed), for example, by the processor 1110. At least a portion of the program module 1210 may include modules, programs, routines, instruction sets, or processes, for performing one or more functions.

The term "module" used in this disclosure may represent a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) may be implemented by instructions stored in a computer-readable storage media in the form of a program module. The instructions, when executed by a processor, may cause the one or more processors to perform a function corresponding to the instruction. The computer-readable storage media, for example, may be the memory 130 of FIG. 1.

A computer-readable recording medium may include a hard disk, a floppy disk, a magnetic media (e.g., a magnetic tape), an optical media (e.g., a compact disc read only memory (CD-ROM), a digital versatile disc (DVD), or a magneto-optical media (e.g., a floptical disk)), and hardware devices (e.g., ROM, RAM, or a flash memory). Also, a program instruction may include not only a mechanical code, such as things generated by a compiler, but also a high-level language code executable on a computer using an interpreter. The above hardware unit may be configured to operate via one or more software modules for performing an operation, and vice versa.

A module or a program module may include at least one of the above elements, or a part of the above elements may be omitted, or additional other elements may further be included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to certain embodiments, it will be understood by those skilled in the art that various changes in form and details may be made therein without departing from the spirit and scope of the present disclosure, which is defined, not by the detailed description and embodiments, but by the appended claims and their equivalents.

What is claimed is:

1. An electronic device comprising:
a microphone configured to obtain an audio signal;
a scene classifier;
a sensor;
a memory in which a speaker model is stored; and
at least one processor,
wherein the at least one processor is configured to:
classify, by the scene classifier, the audio signal as user speech or noise, based on distribution of the audio signal;
in response to classifying the audio signal as noise, control not to receive the audio signal through the microphone;
in response to classifying the audio signal as user speech, obtain a voice signal from the audio signal and compare the voice signal with the speaker model to verify a user;
based on a verification result indicating that the user corresponds to a pre-enrolled speaker, perform an operation corresponding to the obtained voice signal; and
verify the user based on a similarity between the speaker model and a talk model based on talk contents between the pre-enrolled speaker and another speaker,
wherein, when a movement of the electronic device is sensed by the sensor, a buffering signal is transmitted to the microphone such that the audio signal is obtained after a preset point in time when the movement is sensed, and
wherein, while transmitting the buffering signal, a state of the processor is changed from a sleep state to an activation state such that the processor recognizes a command from the obtained voice signal after the buffering signal is transmitted.

2. The electronic device of claim 1, wherein the at least one processor includes a digital signal processor (DSP) electrically connected to the microphone and an application processor (AP) electrically connected to the DSP,
wherein the DSP performs an operation of verifying the user and changes the state of the AP from the sleep state to the activation state based on the verification result indicating the user is the pre-enrolled speaker, and
wherein the AP recognizes the command from the obtained voice signal and performs an operation associated with the command.

3. The electronic device of claim 1, wherein the at least one processor is further configured to:
determine that a signal having energy, a magnitude of which is greater than or equal to a critical value, in the audio signal is the voice signal; and
determine that a signal having energy, the magnitude of which is less than the critical value, is noise.

4. The electronic device of claim 1, wherein the at least one processor is further configured to:
obtain the voice signal based on a zero crossing rate of the audio signal.

5. The electronic device of claim 1, wherein the at least one processor is further configured to:
obtain the voice signal based on a signal to noise ratio (SNR).

6. The electronic device of claim 1, wherein the at least one processor is further configured to:
obtain the voice signal based on a distribution of the audio signal.

7. The electronic device of claim 1, wherein the at least one processor is further configured to:
compare a feature value of the voice signal with a feature value of the speaker model to verify the user.

8. The electronic device of claim 7, wherein at least one of the feature value of the voice signal and the feature value of the speaker model includes at least one of linear prediction coding (LPC) and mel-frequency cepstral coefficients (MFCC).

9. The electronic device of claim 1, wherein the at least one processor is further configured to:
verify the user by using at least one of a hidden Markov model (HMM), a Gaussian mixture model (GMM), a support vector machine (SVM), i-vector, probabilistic linear discriminant analysis (PLDA), and a deep neural network (DNN).

10. The electronic device of claim 1, wherein the at least one processor is further configured to:
verify the user based on a similarity between the speaker model and a universal background model (UBM).

11. The electronic device of claim 1, wherein the at least one processor is further configured to:
obtain the voice signal through the microphone under a specified condition; and
normalize a feature value of the obtained voice signal to generate the speaker model.

12. The electronic device of claim 11, wherein the at least one processor is further configured to:

based on the electronic device transmitting a call to an external device, obtain the voice signal through the microphone.

13. The electronic device of claim 11, wherein the at least one processor is further configured to:
based on a recording application being executed, obtain the voice signal through the microphone.

14. The electronic device of claim 1, wherein the at least one processor is further configured to:
output information about whether the speaker model is generated, through a display.

15. A wearable electronic device comprising:
a sensor configured to sense movement of a user;
a microphone configured to obtain an audio signal based on the movement being sensed;
a memory in which a speaker model is stored; and
at least one processor including a digital signal processor (DSP) electrically connected to the microphone and an application processor (AP) electrically connected to the DSP,
wherein the at least one processor is configured to:
obtain a voice signal from the audio signal;
compare the voice signal with the speaker model to verify a user;
based on a verification result indicating that the user corresponds to a pre-enrolled speaker, perform an operation corresponding to the obtained voice signal, and
when the movement is sensed, transmit a buffering signal to the microphone such that the audio signal is obtained after a preset point in time when the movement is sensed, and
while transmitting the buffering signal, change a state of the AP from a sleep state to an activation state such that the AP recognizes a command from the obtained voice signal after the buffering signal is transmitted.

16. The wearable electronic device of claim 15, wherein the microphone obtains the audio signal after a preset time from a point in time when the movement is sensed.

17. The wearable electronic device of claim 15, wherein the sensor includes at least one of an acceleration sensor, a gyro sensor, a gravity sensor, and a geomagnetic sensor.

18. The wearable electronic device of claim 15, wherein the at least one processor is further configured to:
normalize a feature value of the obtained voice signal to generate the speaker model; and output information about whether the speaker model is generated, to a display.

* * * * *